United States Patent
Heinz et al.

(10) Patent No.: US 6,277,219 B1
(45) Date of Patent: Aug. 21, 2001

(54) DAMAGE TOLERANT ALUMINUM ALLOY PRODUCT AND METHOD OF ITS MANUFACTURE

(75) Inventors: Alfred Ludwig Heinz, Niederahr; Alfred Johann Peter Haszler, Vallendar, both of (DE)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 09/468,812

(22) Filed: Dec. 22, 1999

Related U.S. Application Data
(60) Provisional application No. 60/130,709, filed on Apr. 22, 1999.

(30) Foreign Application Priority Data

| Dec. 22, 1998 | (EP) | 98204372 |
| Jun. 9, 1999 | (EP) | 99201822 |

(51) Int. Cl.[7] ............................................. C22F 1/057
(52) U.S. Cl. ......................... 148/552; 148/693; 148/697
(58) Field of Search .................. 148/697, 552, 148/693

(56) References Cited

U.S. PATENT DOCUMENTS 5,213,639  5/1993  Colvin et al. .

FOREIGN PATENT DOCUMENTS

| 0473122 | 3/1992 | (EP) . |
| 473122 | * 4/1992 | (EP) . |
| 0489408 | 6/1992 | (EP) . |
| 0723033 | 7/1996 | (EP) . |
| 60-251260 | * 12/1985 | (JP) . |

OTHER PUBLICATIONS

Patent Abstracts of Japan, vol. 010, No. 128, May 13, 1996 & JP 60 251260 published Dec. 11, 1985.

* cited by examiner

*Primary Examiner*—George Wyszomierski
*Assistant Examiner*—Janelle Combs-Morillo
(74) *Attorney, Agent, or Firm*—Stevens, Davis, Miller & Mosher, LLP

(57) ABSTRACT

The invention relates to a product comprising an aluminum base alloy consisting of (in weight %): Cu 3.8–4.9, Mg 1.2–1.8, Mn 0.1–0.9, Fe max. 0.12, Si max. 0.10, Ti max. 0.15, Zn max. 0.20, Cr max. 0.10, impurities each max. 0.05, total max. 0.15, balance aluminum. The product having a minimum L-0.2%yield strength of 300 MPa or more, a minimum LT-0.2%yield strength of 270 MPa, a minimum T-L fracture toughness $K_{C(ao)}$ of 100 MPa.$\sqrt{m}$ or more for a 700 mm wide CCT-panel, and has in both L/ST- and LT/ST-sections an average grain size of at least 6 according to ASTM E-112. Further the invention relates to a method for the manufacturing of such a product.

27 Claims, 1 Drawing Sheet

DAMAGE TOLERANT ALUMINUM ALLOY PRODUCT AND METHOD OF ITS MANUFACTURE

CROSS REFERENCE TO RELATED APPLICATIONS

This application claims priority from U.S. Provisional Application No. 60/130,709 filed Apr. 22, 1999, incorporated herein by reference.

FIELD OF THE INVENTION

The invention relates to an improved aluminum alloy product suitable for use in aircraft applications and more particularly, it relates to an improved aluminum alloy and method of manufacturing therefor having improved resistance to fatigue crack growth and fracture toughness and is suitable for use as aircraft skin.

BACKGROUND OF THE INVENTION

For the purpose of this invention sheet material is to be understood as a rolled product having a thickness of not less than 1.3 mm (0.05 inch) and not more than 6.3 mm (0.25 inch), and plate material is to be understood as a rolled product having a thickness of more than 6.3 mm. See also Aluminum Standards and Data, Aluminum Association, Chapter 5 Terminology, 1997.

A cast ingot or slab is a three dimensional object having by definition a length (normally the casting direction in case in (semi)-continuous casting), a width and a thickness, where the width is equal to or greater than the thickness.

The design of commercial aircraft requires different sets of properties for different types of structures of the aircraft. In many parts, resistance to crack propagation either in the form of high fracture toughness or low fatigue crack growth is essential. Therefore, many significant benefits can be realized by improving fracture toughness and fatigue crack growth propagation.

A new material with improved toughness, for example, will have a higher level of damage tolerance. Cyclic loading occurs on a commercial aircraft during the take off/landing when the interior of the aircraft is pressurised. Typically, aircraft may see over 100,000 pressurisation cycles during their normal service lifetime. Thus, it will be noted that great benefit is derived from improved fracture toughness and resistance to fatigue crack growth, both of which are related to cyclic loading.

In the aerospace industry the Aluminum Association alloy AA2024 and modifications thereof have been widely used as a high damage tolerant aluminum alloy, mostly in a T3 temper condition or modifications thereof. As known in the art, alloy of a T3 temper condition has been solution heat treated, cold worked, and naturally aged to a substantially stable condition. Products of these alloys have a relatively high strength to weight ratio and exhibit good fracture toughness, good fatigue properties, and adequate corrosion resistance.

From the European patent no. EP-B-0 473 122 (Alcoa) a method of producing a damage tolerant aluminum alloy sheet product is known, comprising:

| | |
|---|---|
| (a) | providing a body of an aluminum base alloy containing (in wt. %): |
| Cu | 3.8–4.5 |
| Mg | 1.2–1.85 |
| Mn | 0.3–0.78 |
| Fe | 0.5 max., preferably 0.12 max. |
| Si | 0.5 max., preferably 0.10 max. remainder aluminum, optionally 0.2 max. Zn, 0.2 max. Zr, 0.5 max. Cr, and impurities; |
| (b) | hot rolling the body to a slab; |
| (c) | heating said slab to above 488° C. to dissolve soluble constituents; |
| (d) | hot rolling the slab in a temperature range of 315 to 482° C. to a sheet product; |
| (e) | solution heat treating; |
| (f) | cooling; and |
| (g) | ageing to produce a sheet product having high strength and improved levels of fracture toughness and resistance to fatigue crack growth. |

The damage tolerant sheet product obtained by the known method is provided in the T3-condition and is commercially available.

SUMMARY OF THE INVENTION

An object of the invention is to provide an aluminum alloy product with improved damage tolerance properties in comparison with the aluminum sheet product in a T3-condition obtained from the method in accordance with EP-B-0 473 122.

Another object of the present invention is to further improve the mechanical properties of the aluminum sheet product.

Yet another object of the invention is to provide a method for manufacturing the improved aluminum alloy product.

According to the invention in one aspect there is provided in a product comprising an aluminum base alloy consisting of (in weight %): 3.8–4.9% Cu, 1.2–1.8% Mg, 0.1–0.9% Mn, max. 0.12% Fe, max. 0.10%Si, max. 0.15%Ti, max. 0.20% Zn, max. 0.10% Cr, impurities each max. 0.05%, total impurities max. 0.15%, balance aluminum, and the product having a minimum L-0.2%yield strength of 300 MPa or more, a minimum LT-0.2%yield strength of 270 MPa or more, a minimum T-L fracture toughness $K_{C(ao)}$ of 100 MPa √m more for a 700 mm wide center cracked fracture toughness test panel (CCT-panel), and having in both L/ST- and LT/ST-sections an average grain size of at least 6 according to ASTM E-112.

DETAILED DESCRIPTION OF THE PREFERRED EMBODIMENTS

Figure 1:
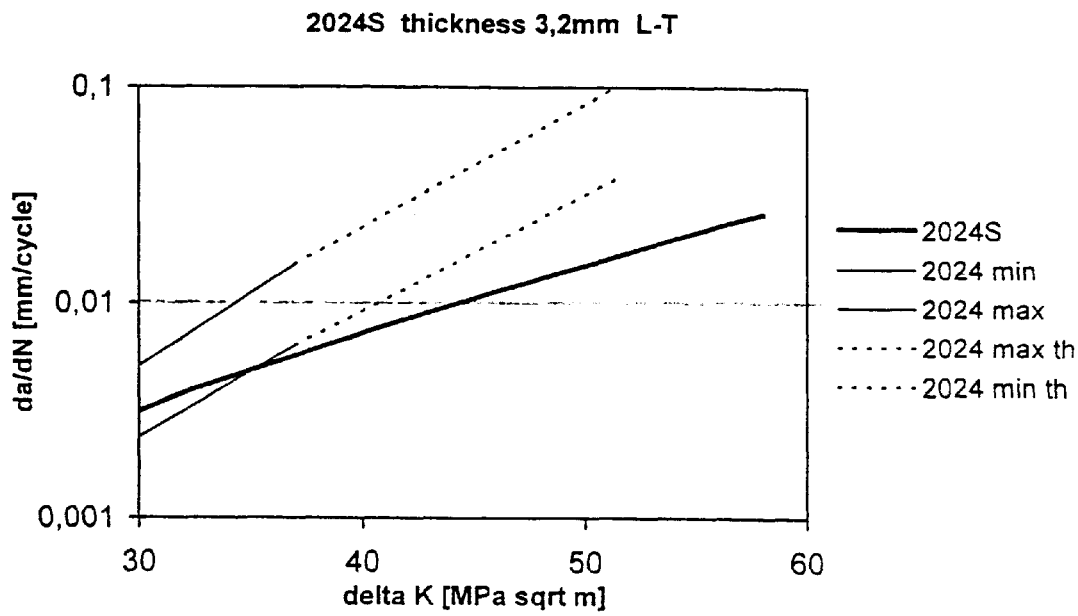
FIG. 1 shows a plot of data of crack propagation characteristics in the T-L direction.

This product in accordance with the invention has improved strength levels and fatigue properties compared with the aluminuim sheet obtained from the known method. This product can be provided both as sheet and plate material. It is believed that the excellent properties are the result of the specific chemistry window in combination with the fine grain structure (ASTM E-112 grain size of 6 or higher) of the product and a relatively small aspect ratio of the grain structure in at least the L/ST- and LT/ST-direction. A further advantage of the product in accordance with the invention is that the properties are more isotropic, in particular the fatigue properties. A more isotropic structure results in particular in improved mechanical properties in the T-L direction of the product, in particular the fatigue properties, which improvement enhances the application of the product.

The product in accordance with the present invention comprises an aluminum base alloy consisting essentially (in weight %) of (typically consisting of) 3.8 to 4.9% Cu, 1.2 to 1.8% Mg, 0.1 to 0.9% Mn, the balance being aluminum and trace and impurity elements. For the trace and impurity elements zinc, titanium and chromium present in the product, the maximum allowable amount of zinc is 0.20%, of titanium is 0.15%, and of chromium is 0.10%. For the impurity elements iron and silicon, the maximum allowable amount of iron is 0.12% and of silicon is 0.10 %. For any other remaining trace elements, each has a maximum limit of 0.05%, with a maximum total for the remaining trace elements being 0.15%. Unless otherwise indicated, all % compositions of the present specification are in weight percent.

In a more preferred embodiment of the product in accordance with this invention the Cu content is limited to a range of 3.8 to 4.7%, and more preferably to a range of 3.8 to 4.6%, and most preferably in the range of 3.9 to 4.6% to maintain good strength in combination with the improved fatigue properties.

In a more preferred embodiment of the product in accordance with the invention the Mg content is limited to a range of 1.2 to 1.7%, and more preferably to a range of 1.2 to 1.6% to maintain good strength in combination with the improved fatigue properties.

The Cu and Mg levels must be controlled in the indicated ranges to maintain good strength while providing the benefits in toughness and fatigue.

In a more preferred embodiment of the product in accordance with the invention the Mn content is limited to a range of 0.1 to 0.8%, and more preferably to a range of 0.2 to 0.8%.

The Fe and Si contents are restricted to very low contents in order to prevent formation of substantial amounts of iron and silicon containing particles, which are detrimental for the fracture toughness and fatigue crack growth resistance.

In another preferred embodiment of the product in accordance with this invention the product has minimum longitudinal (L)-0.2%yield strength of 320 MPa or more, and more preferably of 340 MPa or more, and more preferably of 360 MPa or more, and most preferably of 370 MPa or more. The preferred minimum 0.2%yield strength in the TL-direction (transverse direction) is 270 MPa or more, preferably 280 MPa or more, and more preferably 300 MPa or more, and more preferable 310 MPa or more, and most preferably a minimum of 320 MPa or more.

In another preferred embodiment of the product in accordance with this invention the product is a sheet product and has minimum transverse (TL)-tensile strength of 440 MPa or more, preferably 450 MPa or more, and more preferably 460 MPa or more. Further the sheet product has a minimum longitudinal (L)-tensile strength of 475 MPa or more, preferably of 485 MPa or more, and more most preferably of 490 MPa or more, and most preferably of 495 MPa or more.

In yet another preferred embodiment of the product in accordance with the invention the product has a minimum T-L fracture toughness $K_{C(ao)}$ of 170 MPa.√m or more for 2000 mm wide CCT-panels, and preferably of 175 MPa.√m or more, and more preferably of 180 MPa.√m or more, and more preferably a minimum of 185 MPa.√m or more. The preferred minimum L-T fracture toughness $K_{C(ao)}$ for 2000 mm wide CCT-panels is 170 MPa.√m or more, preferably 180 MPa.√m or more, and more preferably 190 MPa.√m or more, and most preferably 200 MPa.√m or more. The preferred minimum L-T fracture toughness $K_{C(ao)}$ for 700 mm wide CCT-panels is 105 MPa.√m, preferably 110 MPa.√m or more, and more preferably 115 MPa.√m or more, and more preferably 120 MPa.√m or more, and most preferably 125 MPa.√m or more.

LT-0.2% stands for the 0.2% Proof Strength in the LT-direction. Measurement of tensile properties is well known in the art. $K_{C(ao)}$ is also a known expression in the art. The dimensions follow the width of the panel.

The product in accordance with the invention can be used both as sheet or as plate material. However the product is ideally a sheet product for use in structural components of aircraft. The sheet product has preferably an average grain size according to ASTM E-112 of 6 or higher, more preferably ASTM E-112 of 7 to 8 in at least both the L/ST- and LT/ST-section. An L/ST section is to be understood as having a surface with edges in the following two directions: L-direction (longitudinal, normally the rolling direction) and ST-direction (short transverse, normally the thickness of the product). An LT/ST section is to understood as having a surface with edges in the following two directions: LT-direction (long-transverse, normally the width of the product) and ST-direction (short transverse). The aspect ratio of the grain structure of the sheet product is preferably in the range of 1:≦4, and preferably in the range 1:≦3, and more preferably in the range 1:≦2 in both at least the L/ST- and LT/ST-sections. The more equi-axed the grain structure is, the more isotropic are the mechanical properties obtained, in particular the fatigue properties.

The invention also comprises that the product of this invention may be provided with a cladding. Such clad products utilize a core of the aluminum base alloy of the invention and a cladding of usually higher purity (higher percentage aluminum than the core) which, in particular, corrosion protects the core. The cladding includes, but is not limited to, essentially unalloyed aluminum or aluminum containing not more than 0.1 or 1% of all other elements. Aluminum alloys herein designated 1xxx-type series include all Aluminum Association (AA) alloys, including the subclasses of the 1000-type, 1100-type, 1200-type and 1300-type. Thus, the cladding on the core may be selected from various Aluminum Association alloys such as 1060, 1045, 1100, 1200, 1230, 1135, 1235, 1435, 1145, 1345, 1250, 1350, 1170, 1175, 1180, 1185, 1285, 1188, 1199, or 7072. In addition, alloys of the AA7000-series alloys, such as 7072 containing zinc (0.8 to 1.3%), can serve as the cladding and alloys of the AA6000-series alloys, such as 6003 or 6253, which contain typically more than 1% of alloying additions, can serve as cladding. Other alloys could also be useful as cladding as long as they provide in particular sufficient overall corrosion protection to the core alloy. The clad layer or layers are usually much thinner than the core, each constituting 1 to 15 or 20 or possibly 25% of the total composite thickness. A cladding layer more typically constitutes around 1 to 12% of the total composite thickness.

According to the Aluminum Association: 1xxx is 99.00 percent aluminum minimum and greater, AA6xxx are aluminum alloys with magnesium and silicon as their major alloying elements, AA7xxx are aluminum alloys with zinc as their major alloying elements.

In another aspect, the invention provides a method of manufacture of a damage tolerant rolled product having strength and improved levels of fracture toughness and resistance to fatigue crack growth, comprising the steps:

(a) casting an ingot or a slab comprising an aluminum alloy consisting of (in wt. %):
    3.8–4.9 Cu, 1.2–1.8 Mg, 0.1–0.9 Mn, max. 0.12 Fe, max, 0.10 Si, max. 0.15 Ti, max. 0.20 Zn,
    max. 0.10 Cr, impurities each max, 0.05 and total max. 0.15, balance aluminum;
(b) hot rolling the ingot to form an intermediate product;
(c) cold rolling the intermediate product to form a rolled product in both the length and
    width direction with a total cold deformation of more than 60%;
(d) solution heat treating the intermediate product after cold rolling in at least one
    direction;
(e) cooling the solution heat treated intermediate product; and
(f) ageing the cooled intermediate product to produce the rolled product having strength
    and improved levels of fracture toughness and resistance to fatigue crack growth.

The method in accordance with the invention achieves manufacture of a rolled product having a minimum L-0.2%yield strength of 300 MPa or more, a minimum LT-0.2%yield strength of 270 MPa or more, a minimum T-L fracture of toughness $K_{C(ao)}$ of 100 MPa.$\sqrt{m}$ or more for a 700 mm wide CCT-panel, and having in both L/ST- and LT/ST-direction an average grain size of at least 6 according to ASTM E-112. A further advantage of this method is that it results in a rolled product having more isotropic properties, in particular in isotropic fatigue properties, and a grain structure with a relatively small aspect ratio. Another advantage of this method is that it allows for the production of much wider plate or sheet products in comparison with conventional coil production routes. A further advantage of this method is that it allows for the production of much wider plate or sheet products in comparison with coil production routes such as set out in EP-B-0473122. Yet a further advantage of the method in accordance with the invention is that the intermediate heating of the slab to above 488° C. to dissolve soluble constituents during the hot rolling process as described in EP-B-0 473 122 is no longer essential to achieve the desired mechanical properties, however optionally it may be applied.

The aluminum alloy as described herein can be provided in process step (a) as an ingot or slab for fabrication into a suitable wrought product by casting techniques currently employed in the art for cast products, e.g. DC-casting, EMC-casting, EMS-casting. Slabs resulting from continuous casting, e.g. belt casters or roll casters, also may be used.

The cast ingot or slab may be homogenized prior to hot rolling and/or it may be preheated followed directly by hot rolling. The homogenization and/or preheating of AA2024 series alloys and modifications thereof prior to hot rolling are usually carried out at a temperature in the range 400 to 505° C. in single or in multiple steps. In either case, the segregation of alloying elements in the material as cast is reduced and soluble elements are dissolved. If the treatment is carried out below 400° C., the resultant homogenization effect is inadequate. If the temperature is above 505° C., eutectic melting might occur resulting in undesirable pore formation. The preferred time of the above heat treatment is between 2 and 30 hours. Longer times are not normally detrimental. Homogenization is usually performed at a temperature above 485° C., and a typical homogenization temperature is 493° C. A typical preheat temperature is in the range of 440 to 460° C. with a soaking time in a range of 5 to 15 hours.

Typically, prior to hot rolling, the rolling faces of both the cladded and the non-cladded products are scalped in order to remove segregation zones near the cast surface of the ingot.

The hot rolling procedure of the method in accordance with the invention during process step (b) involves preferably hot rolling in both the length and width directions, for which there is no preference, from a metallurgical point of view, with which direction is started. During the hot rolling process rolling directions can be changed alternatively more than once. In a preferred embodiment of the hot rolling procedure of the method in accordance with the invention to obtain the desired grain structure, the product receives a hot rolling deformation in the length direction in the range of 20 and 98% and a hot rolling deformation in the width direction is in the range of 20 to 98%. Hot rolling deformation is defined here as $(h_0-h_1)/h_0$, where $h_0$ is the starting thickness, and $h_1$ is the end thickness for each relevant rolling practice (length or width wise). More preferably the hot rolling deformation in length direction is in the range of 25 to 95%, more preferably in the range of 30 to 95% and even more preferably in the range of 35 to 95%. The hot rolling deformation in the width direction is preferably in the range of 25 to 95%, preferably in the range of 30 to 95%, more preferably in the range of 35 to 95%, and most preferably in the range of 40 to 90%.

By hot rolling the product in both the length and in the width direction, a much finer grain structure in the final cold rolled product (ASTM E-112 grain size of 6 or higher in at least both the L/ST- and LT/ST-sections) is obtained as is a much more equi-axed grain structure.

When necessary during the hot rolling process in accordance with the invention the intermediate plate product can be cut into sub-products as to allow for hot rolling in both the length and width directions.

The final gauge of the intermediate product is kept preferably significantly larger than is usually practiced for the production of this type of products, this to allow a larger total cold roll deformation during the cold rolling process for the required final cold rolled gauge.

After hot rolling and prior to cold rolling the obtained intermediate plate product might be stretched in a range of typically 0.5 to 1.0% of its original length to make the intermediate plate product flat enough to allow subsequent ultrasonic testing for quality control reasons.

The cold rolling procedure of the method in accordance with the present invention during process step (c) is preferably accomplished in as few passes as possible and involves a total cold deformation of more than 60%, preferably more than 80%, and preferably not more than 95%. The higher range of total cold deformation is in particular preferred for sheet material. The total cold deformation is understood as being the total reduction in thickness of the product during cold rolling. A total cold deformation of less than 60% will result in lower strength levels than desired for applications in aircraft structures and total cold deformation levels of more than 95% will result in increased susceptibility of the product to breaking during a final stretching operation.

By cold rolling the product in both the length and in the width direction a much finer grain structure (ASTM E-112 grain size of 6 or higher in at least both the L/ST- and LT-ST-sections) is obtained, as is a much more equi-axed grain structure. A more equi-axed grain structure results in favorable and more isotropic mechanical properties, in particular for the desired more isotropic fatigue properties.

In a preferred embodiment of the cold rolling procedure of the method in accordance with this invention as to obtain the desired grain structures, the intermediate product is first cold rolled in one direction, which can be either the length or the width direction, with a total cold deformation in the range of 20 to 55%, preferably in the range of 30 to 55% and more preferably in the range of 40 to 55%, and then 90° turned and then further cold rolled in the other direction to a rolled product with a total cold deformation of more than 60%, preferably more than 70%, preferably more than 80%, preferably more than 85%, and preferably not more than 95%. From a metallurgical point of view there is no real preference to start first with cold rolling the intermediate product in the length direction and subsequently in the width direction, and vice versa. In particular a high total cold deformation is preferred to obtain high mechanical properties and a very fine grain structure (ASTM E-112 grain size of 7 or higher in at least both the L/ST- and LT/ST-sections). Further a higher total cold deformation enhances recrystallization is subsequent heat-treatments. A total cold deformation of less than 60% will not give the desired grain structure, while a cold deformation of more than 95% will require many interanneals with the risk of Cu diffusion into the clad layer, and increased cost, and lower processing yield due to an increased handling and surface damage.

In a further preferred embodiment of the cold rolling procedure of the method in accordance with the invention, the intermediate product, which may be a plate or a sheet product, is first, by process step (c-i), cold rolled in at least one direction, which can be either the length or the width direction, or a combination thereof, with a total cold deformation in the range of 20 to 55%, preferably in the range of 30 to 55%. Following this first cold rolling step, the intermediate product is solution heat treated, process step (c-ii), and then quenched to below 175° C., and preferably to room temperature. Following the cooling the quenched intermediate product is brought, by process step (c-iii), to a T3, and more preferably to a T351-temper by means of stretching in the range of 0.5 to 8% of its original length, preferably in the range of 0.5 to 4%, and most preferably in the range of 0.5 to 3%. Subsequently, the intermediate product is aged, preferably by means of natural ageing in the range of at least 2 days, preferably for at least 5 days, and more preferably for at least 7 days. Following ageing the intermediate product is soft annealed, process step (c-iv), and then cold rolled, process step (c-v), to a final gauge thickness by cold rolling in the other direction, such that the total cold deformation is at least 60% or more, preferably by cold rolling in both the length and in the width direction. During the cold rolling to final gauge the product may be inter-annealed as set out above. With this improved embodiment it is possible to achieve the higher levels of strength and fracture toughness in the product and further to achieve more isotropic properties in the final product.

After the alloy product is initially cold rolled the intermediate product is during process step (c-ii) typically solution heat treated at a temperature in the range of 460 to 505° C. for a time sufficient for solution effects to approach equilibrium, with typical soaking times in the range of 5 to 120 minutes. The solution heat treatment is typically carried out in a batch furnace. Typical soaking times at the indicated temperature is in the range of 5 to 40 minutes. However, with clad products, care should be taken against too long soaking times since in particular copper may diffuse into the cladding which can detrimentally affect the corrosion protection afforded by the cladding. After solution heat treatment, it is important that the aluminum alloy be cooled to a temperature of 175° C. or lower, preferably to room temperature, to prevent or minimize the uncontrolled precipitation of secondary phases, e.g. $Al_2CuMg$ and $Al_2Cu$. On the other hand cooling rates should not be too high in order to allow for a sufficient flatness and low level of residual stresses in the product. Suitable cooling rates can be achieved with the use of water, e.g. water immersion or water jets.

The soft annealing during process step (c-iv) can be carried out by holding the product at a temperature in the range of 300 to 430° C. for a soaking time, wherein the product is at temperature, in the range of 0.5 to 12 hours. A more preferred soft annealing treatment involves a temperature in the range of 350 to 410° C. for a soak time in the range of 1 to 8 hours.

Between the various cold rolling passes of the various embodiments of the cold rolling practice as set out above, an inter-anneal treatment or intermediate anneal can be applied to improve workability by recrystallization of the non-cladded cold rolled product. Typically the inter-anneal involves a soft-anneal treatment at a temperature in the range of 300 to 430° C. and a soak-time in the range of 0.5 to 12 hours. A more preferred soft-anneal treatment involves a temperature in the range of 350 to 410° C. for a soak time in the range of 0.5 to 8 hours. After soft-annealing the product is preferably cooled slowly in order to control properties of the final product. The soft-annealing results in a very soft product which can bear cold rolling reductions of 60% or more. In addition the relatively high temperature in combination with the slow cooling rate are thought to result in a coarse particle distribution which results in high localized strain around the particles and thus increases the tendency for recrystallization in the following heat treatment step. For the cladded cold rolled product a lower temperature range may be required, but not by way of limitation, in order to avoid in particular excessive diffusion of, in particular, copper from the core alloy to the cladding. This diffusion can detrimentally affect the corrosion protection afforded by the cladding. In this case the inter-anneal treatment or intermediate anneal can de done typically in the temperature range of 220 to 350° C. and a soak-time in the range of 10 min. to 12 hours. At such relatively low temperatures full recrystallization does not occur until the final solution heat treatment step (d). However such heat-treatment results in sufficient recovery as to improve workability of the product.

Preferably, but not by way of limitation, after cold rolling in one direction, which can be either the length or the width direction, and prior to rolling in the other direction the product is solution heat treated at a temperature in the range of 460 to 505° C. for a time sufficient for solution effects to approach equilibrium. Typical soaking times are in the range of 5 to 120 minutes, and preferably in a range of 5 to 45 min.

After the alloy product is cold rolled the product is during process step (d) typically solution heat treated at a temperature in the range of 460 to 505° C. for a time sufficient for solution effects to approach equilibrium, with typical soaking times in the range of 5 to 120 minutes. The solution heat treatment is typically carried out in a batch furnace. Typical soaking times at the indicated temperature is in the range of 5 to 30 minutes. However, with clad products, care should be taken against too long soaking times since in particular copper may diffuse into the cladding which can detrimentally affect the corrosion protection afforded by said cladding. After solution heat treatment, it is important that the aluminum alloy during process step (e) be cooled to a temperature of 175° C. or lower, preferably to room temperature, to prevent or minimize the uncontrolled precipitation of secondary phases, e.g. Al$_2$CuMg and Al$_2$Cu. On the other hand cooling rates should not be too high in order to allow for a sufficient flatness and low level of residual stresses in the product. Suitable cooling rates can be achieved with the use of water, e.g. water immersion or water jets.

The product may be further cold worked, for example, by stretching up in the range of 0.5 to 8% of its original length in order to relieve residual stresses therein and to improve the flatness of the product. Preferably the stretching up is in the range of 0.5 to 6%, more preferably of 0.5 to 4% and most preferably of 0.5 to 3%.

After cooling the product is during process step (f) naturally aged, typically at ambient temperatures, and alternatively the product can be artificially aged. Artificial ageing during process step (f) can be of particular use for higher gauge products.

The product in accordance with the invention could be provided to a user in a non-solution heat treated condition, such as an "F" temper or an annealed "O" temper, and then formed and solution heat treated and aged by the user.

The invention further includes the use of the aluminum alloy of this invention or the product obtained in accordance with the method of this invention as aircraft skin. More preferably the aircraft skin is a wing skin or an aircraft fuselage panel.

The invention will now be illustrated by several non-limiting examples.

EXAMPLE 1

Non-cladded sheet material of 3.17 mm alloy product in the T3-condition was manufactured on an industrial scale in accordance with the method of this invention. The processing route included: DC-casting an industrial scale ingot with dimensions 440×1470×2700 mm (thickness×width×length) and having the following composition (in weight percent): 4.52% Cu, 1.45% Mg, 0.69% Mn, 0.087% Si, 0.091% Fe, 0.023% Zn, 0.020% Ti, 0.001% Zr, balance aluminum and inevitable impurities. The ingot has been homogenized for 25 hours at 493° C., cooled to room temperature, scalped by milling 15 mm per side, preheated to 450° C. for 10 hours, hot rolled in a width direction to an intennediate gauge of 312 mm, turned 90° and hot rolled about 20 mm in a length direction, subsequently cut into sub-plates and cooled to room temperature to form an intermediate product. Then the intermediate product was cold rolled in its length direction to a gauge of 10 mm and then solution heat treated for 35 minutes soak at 495° C., cooled to room temperature by means of a spray quench with cold water and stretched for about 1.5% of its original length. Subsequently the product was cold rolled in its width direction to a gauge of 5.0 mm and soft annealed for 2 hours at 400° C. and cooled to room temperature with a cooling rate of not more than 15° C./hour. Then cold rolled in width direction to a final gauge of 3.17 mm. At final gauge the sheet product has been solution heat treated for 15 min. at 495° C. and spray quenched with cold water to room temperature. The solution heat treated sheet product was then stretched for about 2% of its original length and subsequently artificially aged.

The average grain size (both in micron and in ASTM E-112 classification) and the aspect-ratio of the grain structure has been measured and compared with 4.14 mm sheet material manufactured in accordance with the method known from EP-B-0 473 122. The results are given in Table 1.

From the results in Table 1 it can be seen that the sheet material manufactured in accordance with the invention has a much finer grain size and further has a much more equi-axed grain structure compared with the product obtained by the known method.

TABLE 1

| | L/ST-section | | | LT/ST-section | | |
|---|---|---|---|---|---|---|
| | Average grain size | | Aspect | Average grain size | | Aspect |
| | Micron | ASTM | ratio | Micron | ASTM | ratio |
| This invention | 26 | 7–8 | 1:1.9 | 26 | 7–8 | 1:1.8 |
| EP-0 473 122 | 122 | 3 | 1:8.3 | 80 | 4–5 | 1:4.7 |

EXAMPLE 2

Sheet material of 1.6 mm of non-cladded alloy product having the same composition as with Example 1 and in the T3-condition has been manufactured on an industrial scale in accordance with the method of this invention. The processing route and the chemical composition was identical to Example 1, with the exception that the sheet material is cold rolled to a final gauge of 1.6 mm instead of 3.17 mm. The non-cladded sheets were supplied as four panels nominally 1200 mm×2000 mm. These panels had been prepared such that two had an L-T orientation and two had a T-L orientation.

Tensile test pieces with a 6 mm gauge width and 30 mm gauge length were machined from the sheets in the longitudinal and transverse directions and with their tensile axis between 0° to 90°, at 30° intervals, to the final rolling direction. The tensile tests were carried out according to BS 18, Category 2 1987. BS 18, Category 2 1987 is a British Standard of testing.

Fatigue crack growth tests were carried out at stress ratios (R)=0.1 and 0.385 under sinusoidal loading at a frequency of 20 Hz using 420 mm×160 mm wide center cracked test panels. Crack length measurements were taken every 0.3 mm of crack growth using a pulsed double probe DC potential drop method.

Fracture resistance curves were determined using center cracked fracture toughness (CCT) test panels for panel widths of 700 mm and 2000 mm. For panel widths up to 700 mm an l/W ratio of 1.5 was used as recommended in ASTM E561-86 (incorporated herein by reference), whereas for the 2000 mm wide panels a l/W ratio=0.5 had to be used; "l" is the distance between the grips and "W" is the test panel width. In both cases the initial starter slot length (2a) was 0.3 W. The final 5 mm of the slot used for the 2000 mm wide panel was made using a 0.3 mm thick jig saw blade whereas the final 10 mm of the slot for the smaller panels was made using a 0.25 mm thick jewellers saw blade. Anti-buckling plates were used during the tests which completely covered the test panel; the inner faces were greased to prevent load transfer from the test panel. The fracture toughness data and the fracture resistance curve (R curve) were determined according to ASTM E561-86 and to the GARTEur recommendations. The Koiter finite width correction was used for panels with l/W ratio 1.5 and 2.0 and the R.A.E. developed correction for panels with l/W ratio 0.5, see also the article by G. R. Sutton et al., in Fatigue & Fracture of Engineering Materials and Structures, 14, 823(1991). R.A.E. stands for Royal Aircraft Establishment, it is a department of DRA (Defense Research Agency), Aerospace Division, RAE, Farnborough, Hampshire, UK. The net section stress was calculated using the compliance crack length minus the Irwin plastic zone correction. The fracture toughness values $K_{C(ao)}$ and $K_C$ were calculated using the maximum load with the original starter slot length and compliance crack length respectively. In American based literature $K_{C(ao)}$ of a material is often referred to as $K_{app}$ or as apparent fracture toughness.

The tensile data for the different sheets are presented in Table 2. The effects of test orientation are presented in Table 3. From these data it can be seen that the material in accordance with the invention provides very high tensile properties, and further that the properties are much more isotropic than conventional 2024-T3 material or what might be expected from material obtained by the known method.

The fracture toughness in the T-L and L-T directions are presented in Table 4 (1 ksi.√inch=1.1 MPa.√m) from these results it can be seen that the material in accordance with the invention provides very high fracture toughness and high fracture resistance, and further that these properties are much more isotropic than AA2024-T3 material reported so far.

The fatigue crack growth rates (in mm/cycle) in the T-L and L-T directions are listed in Table 5. No macro-crack deviation occurred over the stress intensity factor range investigated for either stress ratio. The fatigue crack growth rates under sinusoidal loading for stress ratios R=0.1 and R=0.385 were independent of test orientation. The presence of a clad layer would not change this independency. From these results it can be seen that the sheet material manufactured in accordance with the invention exhibits a good resistance to fatigue crack growth for both testing directions.

TABLE 2

| Sheet | 0.2% PS (MPa) | TS (MPa) | Elong (%) |
|---|---|---|---|
| | Longitudinal | | |
| 1 | 389 | 504 | 19.1 |
| | 405 | 506 | 19.7 |
| 2 | 388 | 502 | 18.8 |
| | 389 | 505 | 20.4 |
| 3 | 389 | 507 | 17.5 |
| | 388 | 507 | 20.5 |
| 4 | 384 | 496 | 18.6 |
| | 371 | 498 | 18.8 |

TABLE 2-continued

| Sheet | 0.2% PS (MPa) | TS (MPa) | Elong (%) |
|---|---|---|---|
| | Transverse | | |
| 1 | 323 | 485 | 21.4 |
| | 325 | 487 | 21.6 |
| 2 | 325 | 486 | 22.2 |
| | 327 | 488 | 22.6 |
| 3 | 330 | 412 | 21.5 |
| | 333 | 488 | 21.1 |
| 4 | 326 | 479 | 24.8 |
| | 320 | 476 | 23.9 |

In the Tables of this specification, 0.2% PS stands for 0.2% Proof Strength, TS stands for Tensile Strength; Elong. stands for Elongation at fracture. These are measured according to BS 18 etc.

TABLE 3

| Sheet | Test angle to RD | 0.2% PS (MPa) | TS (MPa) | Elong. (%) |
|---|---|---|---|---|
| 1 | 0 | 413 | 501 | 15.7 |
| | 30 | 363 | 482 | 15.8 |
| | 60 | 354 | 484 | 22.2 |
| | 90 | 325 | 478 | 21.4 |
| 2 | 0 | 378 | 490 | 19.0 |
| | 30 | 329 | 477 | 21.8 |
| | 60 | 317 | 471 | 21.9 |
| | 90 | 316 | 470 | 19.7 |
| 3 | 0 | 378 | 490 | 20.6 |
| | 30 | 333 | 473 | 21.3 |
| | 60 | 324 | 468 | 21.8 |
| | 90 | 318 | 469 | 22.2 |

In Table 3, RD stands for Rolling Direction.

TABLE 4

| Panel width (mm) | l/W | 0.2% PS (MPa) | Net section stress (MPa) | $K_{c(ao)}$ (MPa√m) | $K_c$ (MPa√m) |
|---|---|---|---|---|---|
| | | L-T orientation | | | |
| 700 | 1.5 | 397 | 375 | 148 | 212 |
| 2000 | 0.5 | 389 | 348 | 219 | 283 |
| 2000 | 0.5 | 376 | 354 | 219 | 281 |
| | | T-L orientation | | | |
| 700 | 1.5 | 325 | 325 | 128 | 194 |
| 2000 | 0.5 | 326 | 325 | 196 | 261 |

TABLE 5

| Delta K | R = 0.1 | | R = 0.385 | |
|---|---|---|---|---|
| (MPa.√m) | T-L | L-T | T-L | L-T |
| 5.0 | 6.0 E-6 | 4.0 E-6 | 1.4 E-5 | 1.5 E-5 |
| 6.0 | 1.5 E-5 | 1.0 E-5 | 2.3 E-5 | 1.3 E-5 |
| 7.0 | 3.8 E-5 | 3.0 E-5 | 4.8 E-5 | 4.8 E-5 |
| 8.0 | 5.2 E-5 | 4.0 E-5 | 7.5 E-5 | 7.5 E-5 |
| 9.0 | 7.0 B-5 | 6.0 E-5 | 1.0 E-4 | 1.0 E-4 |
| 10.0 | 9.0 E-5 | 8.0 E-5 | 1.5 E-4 | 1.5 E-4 |
| 15.0 | 2.0 E-4 | 1.8 E-4 | 3.5 E-4 | 3.5 E-4 |
| 20.0 | 5.0 E-4 | 4.5 E-4 | 9.0 E-4 | 8.5 E-4 |
| 30.0 | 2.0 E-3 | 2.0 E-3 | 7.0 E-3 | 7.0 E-3 |

EXAMPLE 3

On an industrial scale three ingots (A, B, and C) have been DC-cast and processed in various ways, summarized in Table 6. The cast ingots had dimensions of 440×1470×2700 mm. The chemical compositions of all three ingots were identical, and were (in weight %): 4.36% Cu, 1.45% Mg, 0.56% Mn, 0.045% Si, 0.043% Fe, 0.019% Ti, balance aluminum and inevitable impurities. The cast ingots have been homogenized in a two-step homogenization cycle in which they were first soaked for 2 hours at 460° C. and then 25 hours at 495° C. Then the cast and homogenized ingots were cooled to room temperature by air cooling, and scalped by milling 20 mm per side, preheated prior to hot rolling for 10 hours at 410° C. All three homogenized ingots have been cladded with AA1xxx-series material via 20 mm plates per side. With ingot A material the cladded ingot has been hot rolled in its length direction to 100 mm intermediate gauge, while with ingot B and C material the cladded ingots were first hot rolled in their length direction to an intermediate of 380 mm in order to establish a bonding with the cladding and the core, and subsequently hot rolled in their width direction to an intermediate gauge of 233 mm. Then depending on the ingot material they have been hot rolled to a final intermediate hot rolled product. Following the intermediate products have been cold rolled in length direction (ingot A and C material) or in width direction (ingot B material), with an intermediate gauge of 9, 9 and 18 mm respectively for ingot A, B and C material. Following the first cold rolling step the product was solution heat treated (SHT) at 495° C. form soak time depending on the intermediate gauge thickness. Following solution heat treatment the products have been cooled to room temperature by means of a spray quench with cold water and stretched for about 1.5% of its original length. The intermediate products were then brought to an T351-temper by holding them for 10 days at room temperature to allow for natural ageing. Following ageing and prior to further cold rolling the products have been soft annealed by holding the products for about 30 to 60 min at 350° C. (this intermediate ageing treatment has been indicated in Table 6 as BG4). Depending on the ingot material cold rolled products of three different gauges have been produced, namely, 4.5, 3.6 and 3.2 mm, by rolling in the length or width direction. With ingot C material also an intermediate soft anneal has been applied. Following cold rolling to final gauge thickness the products have been solution heat treated by holding for about 15 to 20 minutes at 495° C., quenching with cold water to room temperature and stretching for about 1.5% of its original length. Subsequently the products were brought to an T351-temper by holding them at least for 10 days at room temperature to allow for natural ageing.

Following natural ageing the products have been tested for their mechanical properties in both the L- and LT-direction as a function of the final gauge thickness. The results of the tensile tests are listed in Table 7.

Further the products have been tested in the L-T and T-L directions in the Kahn-tear-test in accordance with ASTM-B871 (1996-edition). For this the test specimens have been milled on both sides prior to testing to a final thickness of 2.0 mm. The results are listed in Table 8, were TS stands for tear strength and UPE stands for unit propagation energy.

Further the products have been tested at two gauges in the L-T and T-L directions for their $K_C$ and $K_{C(ao)}$ in accordance with ASTM E561-86 for 760 mm wide CCT-panels. The results are listed in Table 9.

Figure 2:
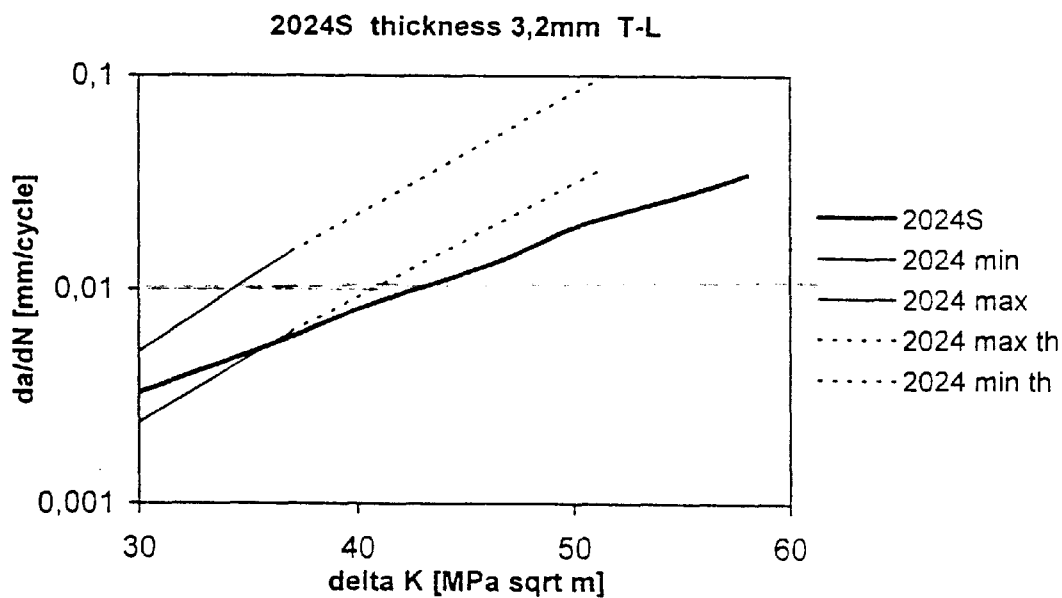
FIG. 2 shows a plot of data of crack propagation characteristics in the L-T direction.

Further 3.2 mm sheet material from ingot C has been tested for its crack propagation characteristics in the T-L and L-T direction, of which the results are shown in FIG. 1 for the T-L direction and in FIG.2 for the L-T direction. The testing samples had a width of 400 mm, and a thickness of 3.2 mm. The testing conditions were a laboratory environment, a test frequency of 8 Hz, and the R-ratio was 0.1. Usually 2024 material is tested to ΔK-values of about 35 MPa.√m. The range of standard 2024 material is plotted in these figures and extrapolated to higher values (dashed lines, 2024 max th., and 2024 min th.). The term "th" stands for "theory", it is a theoretical extrapolation. In FIGS. 1 and 2 the measured results for the higher ΔK-values are given for the sheet material in accordance with the invention.

From the results of Table 7 it can be seen that the yield strength and the tensile strength increase with increasing cold rolling degree. Further it can be seen that the best results for the yield strength and the tensile strength for both the L- and LT-direction are obtained by the material processed of ingot C, which includes cold rolling in both the length and the width direction after the T351-temper followed by soft annealing. Further in the ingot C material a better balance is obtained in the two testing directions.

From the results of Table 8 it can be seen that for the TS, which is an indication for the crack initiation properties of a material, the best results are obtained with ingot C material. The best results for the UPE, which is an indication for the crack propagation, are obtained also with ingot C material.

From these results it can be seen that in order to achieve the highest levels of mechanical properties and the best isotropic properties, a high cold rolling degree is preferred in combination with cold rolling in both the length and the width direction, which cold rolling in both directions is preferably applied after cold rolling and a T351-temper of an intermediate cold rolled product.

From the results of Table 9 it can be seen that the best results of fracture toughness values are obtained with ingot C material.

From the results of FIGS. 1 and 2 it can be seen that the material in accordance with the invention has da/dN values which fall within the range of standard 2024 sheet material for the ΔK-values up to about 35 MPa.√m. For the higher ΔK-values the material in accordance with the invention has significantly lower crack growth rates than what would be expected from standard 2024 material in both testing directions, which is an unexpected improvement.

TABLE 6

| Processing step | Ingot A | Ingot B | Ingot C |
|---|---|---|---|
| Homogenization | 460° C. for 2 hours/495° C. for 25 hours | | |
| 1st hot rolling | length 100 mm | length 380 mm | |
| 2nd hot rolling | width 18 mm | width 233 mm | |
| 3rd hot rolling | — | length 18 mm | length 30 mm |
| 1st cold rolling | length 9 mm | width 9 mm | length 18 mm |
| SHT | 495° C. for 30 min. | | 495° C. for 60 min. |
| BG4 | 10 days natural ageing/350° C. for 1 hour | | |
| 2nd cold rolling | width to 4.5/3.6/3.2 mm | length to 4.5/3.6/3.2 mm | width 9 mm |
| Interanneal | — | — | 350° C. for 30 min. |
| 3rd cold rolling | — | — | length to 4.5/3.6/3.2 mm |
| SHT | 495° C. for 15 min. + quench | | |
| Stretching | 1.5% of original length | | |
| Ageing | 10 days natural ageing | | |

TABLE 7

| Ingot material | Final gauge | 0.2% PS (MPa) L | 0.2% PS (MPa) LT | UTS (MPa) L | UTS (MPa) LT | Elong. (%) L | Elong. (%) LT |
|---|---|---|---|---|---|---|---|
| A | 4.5 | 318 | 298 | 448 | 440 | 20.5 | 19.8 |
|   | 3.6 | 328 | 307 | 451 | 444 | 21.7 | 19.4 |
|   | 3.2 | 344 | 317 | 457 | 445 | 20.1 | 18.3 |
| B | 4.5 | 321 | 304 | 453 | 445 | 21.8 | 20.2 |
|   | 3.6 | 321 | 304 | 451 | 442 | 21.0 | 19.5 |
|   | 3.2 | 335 | 312 | 453 | 455 | 20.1 | 21.0 |
| C | 4.5 | 328 | 306 | 465 | 452 | 20.0 | 20.8 |
|   | 3.6 | 367 | 332 | 471 | 452 | 17.7 | 17.7 |
|   | 3.2 | 373 | 339 | 465 | 452 | 16.6 | 16.7 |

In Table 7, UTS stands for Ultimate Tensile Strength.

TABLE 8

| Ingot material | Final gauge | TS (MPa) L-T | TS (MPa) T-L | UPE (kJ/m²) L-T | UPE (kJ/m²) T-L |
|---|---|---|---|---|---|
| A | 4.5 | 544 | 555 | 226 | 246 |
|   | 3.6 | 545 | 579 | 215 | 224 |
|   | 3.2 | 551 | 572 | 207 | 214 |
| B | 4.5 | 515 | 557 | 212 | 248 |
|   | 3.6 | 551 | 568 | 220 | 285 |
|   | 3.2 | 551 | 594 | 249 | 262 |
| C | 4.5 | 558 | 527 | 308 | 227 |
|   | 3.6 | 587 | 558 | 291 | 245 |
|   | 3.2 | 561 | 586 | 246 | 257 |

TABLE 9

| Ingot material | Final gauge | $K_c$ (MPa√m) L-T | $K_c$ (MPa√m) T-L | $K_{c(ao)}$ (MPa√m) L-T | $K_{c(ao)}$ (MPa√m) T-L |
|---|---|---|---|---|---|
| A | 3.2 | 206 | 196 | 144 | 132 |
|   | 4.5 | 216 | 198 | 145 | 128 |
| B | 3.2 | 234 | 218 | 150 | 134 |
|   | 4.5 | 215 | 203 | 144 | 129 |
| C | 3.2 | 241 | 212 | 155 | 134 |
|   | 4.5 | 222 | 189 | 149 | 132 |

Having now fully described the invention, it will be apparent to one of ordinary skill in the art that many changes and modifications can be made without departing from the spirit or scope of the invention as set forth by the claims appended hereto.

What is claimed is:

1. A method for manufacturing a damage tolerant alloy product, comprising the sequential steps of:
    (a) casting an ingot or a slab comprising an aluminum alloy consisting of (in wt. %):

| | |
|---|---|
| Cu | 3.8–4.9 |
| Mg | 1.2–1.8 |
| Mn | 0.1–0.9 |
| Fe | max. 0.12 |
| Si | max. 0.10 |
| Ti | max. 0.15 |
| Zn | max. 0.20 |
| Cr | max. 0.10 | impurities each max. 0.05, total impurities max. 0.15, balance aluminum;
    (b) hot rolling the ingot to form an intermediate product;
    (c-i) first cold rolling the intermediate product in either the length or the width direction with a cold deformation in the range of 20 to 55%;
    (c-ii) first solution heat treating the intermediate product after cold rolling;
    (c-iii) tempering the solution heat treated intermediate product to a T3 or a T351-temper;
    (c-iv) soft annealing the tempered intermediate product; and
    (c-v) second cold rolling of the soft annealed intermediate product in at least the other direction to a final gauge thickness with a total cold deformation of more than 60%;
    (d) second solution heat treating the intermediate product after the second cold rolling;
    (e) cooling the second solution heat treated intermediate product; and
    (f) ageing the cooled intermediate product;
    said damage tolerant product having a minimum L-0.2% yield strength of 300MPa or more, a minimum LT-0.2% yield strength of 270 MPa, a minimum T-L fracture toughness $K_{C(ao)}$ of 100 MPa. √m or more for a 700 mm wide CCT-panel, and having in both L/ST-and LT/St- sections an average grain size of at least 6 according to ASTM E-112.

2. The method in accordance with claim 1, wherein during process step (c-v) the soft annealed intermediate product is cold rolled in both the length direction and in the width direction.

3. The method in accordance with claim 1, wherein the hot rolling of the ingot to the intermediate product occurs after homogenization, wherein the homogenization occurs at a temperature of 400 to 505° C.

4. The method in accordance with claim 1, wherein at least one step selected from the group consisting of the first solution heat treating and the second solution heat treating occurs at a temperature of 460 to 505° C. for 5 to 120 minutes.

5. The method in accordance with claim 1, wherein the at least one member selected from the group consisting of the first solution heat treated intermediate product and the second solution heat treated intermediate product is cooled to a temperature of 175° C. or lower.

6. The method in accordance with claim 1, wherein soft annealing of the cooled intermediate product occurs at a temperature of 300 to 430° C. for 0.5 to 12 hours.

7. The method in accordance with claim 1, wherein between cold rolling passes, the intermediate product is soft annealed at a temperature of 300 to 430° C. for 0.5 to 12 hours.

8. The method of claim 1, wherein the damage tolerant alloy product is a sheet or a plate and further comprising assembling an aircraft skin comprising the sheet or plate of the damage tolerant alloy product.

9. The method in accordance with claim 1, wherein during step (b) the ingot is hot rolled in the length direction and hot rolled in the width direction, with no heating above 488° C. between the hot rolling steps.

10. The method in accordance with claim 1, wherein during step (b) the ingot is hot rolled in both the length and in the width direction.

11. The method in accordance with claim 1, wherein the total cold deformation ranges from more than 70% to at most 95%.

12. The method in accordance with claim 1, wherein the Cu content is in a range of 3.8 to 4.7%.

13. The method in accordance with claim 1, wherein the Cu content is in a range of 3.9 to 4.6%.

14. The method in accordance with claim 1, wherein the Mg content is in a range of 1.2 to 1.7%.

15. The method in accordance with claim 1, wherein the Mn content is in a range of 0.1 to 0.8%.

16. The method in accordance with claim 1, wherein the product has minimum longitudinal (L)-0.2% yield strength of 360 MPa or more, the minimum 0.2% yield strength in the TL-direction (transverse direction) is 300 MPa.

17. The method in accordance with claim 1, wherein the product has minimum transverse (TL)-tensile strength of 440 MPa or more and a minimum longitudinal (L)-tensile strength of 475 MPa or more.

18. The method in accordance with claim 1, wherein the product has minimum L-T fracture toughness $K_{C(ao)}$ of 105 MPa.√m for 700 mm wide CCT-panels.

19. The method in accordance with claim 1, wherein the minimum T-L fracture toughness $K_{C(ao)}$ is 170 MPa.√m or more for 2000 mm wide CCT-panels.

20. The method in accordance with claim 1, wherein the minimum T-L fracture toughness $K_{C(ao)}$ is 175 MPa.√m or more for 2000 mm wide CCT-panels.

21. The method in accordance with claim 1, wherein the grain aspect ratio of the product in both L/ST- and LT/ST-sections is 1:4 or less.

22. The method in accordance with claim 1, wherein the grain aspect ratio of the product in both L/ST- and LT/ST-sections is 1:3 or less.

23. The method in accordance with claim 1, wherein the grain aspect ratio of the product in both L/ST- and LT/ST-sections is 1:2 or less.

24. The method in accordance with claim 1, wherein the product is a sheet product.

25. The method in accordance with claim 1, wherein the product is a plate product.

26. The method in accordance with claim 1, further comprising applying a cladding on the alloy of the product, the cladding comprising a higher purity aluminum alloy than the alloy of the product.

27. The method in accordance with claim 1, further comprising applying a cladding on the alloy of the product, the cladding comprising a member of the group consisting of:

(i) an alloy of the Aluminum Association AA1000 series;

(ii) an alloy of the Aluminum Association AA6000 series; and (iii) an alloy of the Aluminum Association AA7000 series.

* * * * *